US011596046B2

United States Patent
Silverstein et al.

(10) Patent No.: US 11,596,046 B2
(45) Date of Patent: Feb. 28, 2023

(54) LUMINAIRE CONTROLLER AND METHOD OF CONTROLLING A LUMINAIRE

(71) Applicant: Liteline Corporation, Richmond Hill (CA)

(72) Inventors: Daniel Silverstein, Toronto (CA); Mircea Porumbaceanu, Richmond Hill (CA); Zhang ZhangHai, Shenzhen (CN); Zhong DeJian, Shenzhen (CN)

(73) Assignee: Liteline Corporation, Richmond Hill (CA)

( * ) Notice: Subject to any disclaimer, the term of this patent is extended or adjusted under 35 U.S.C. 154(b) by 0 days.

(21) Appl. No.: 17/517,572

(22) Filed: Nov. 2, 2021

(65) Prior Publication Data

US 2022/0141942 A1 May 5, 2022

Related U.S. Application Data

(60) Provisional application No. 63/108,848, filed on Nov. 2, 2020.

(51) Int. Cl.
*H05B 47/19* (2020.01)
(52) U.S. Cl.
CPC .................................. *H05B 47/19* (2020.01)
(58) Field of Classification Search
CPC ........ H05B 47/17; H05B 47/18; H05B 47/19; H05B 47/165; Y02B 20/40; Y02D 30/70; H04W 52/0216
See application file for complete search history.

(56) References Cited

U.S. PATENT DOCUMENTS

| | | | | |
|---|---|---|---|---|
| 7,821,160 B1* | 10/2010 | Roosli | ................... | H05B 47/18 |
| | | | | 307/112 |
| 10,156,350 B1* | 12/2018 | Belliveau | ............ | F21V 23/0435 |
| 2011/0267802 A1* | 11/2011 | Petrillo | ................ | H05B 39/088 |
| | | | | 362/85 |
| 2012/0020130 A1* | 1/2012 | Dougherty | .......... | H02M 5/2573 |
| | | | | 363/126 |
| 2012/0235573 A1* | 9/2012 | Wu | ........................ | H05B 47/19 |
| | | | | 315/131 |
| 2014/0152188 A1* | 6/2014 | Bora | ..................... | H05B 47/19 |
| | | | | 315/210 |
| 2017/0231061 A1* | 8/2017 | Deese | ....................... | F21S 9/03 |

* cited by examiner

*Primary Examiner* — Haissa Philogene
(74) *Attorney, Agent, or Firm* — Graham Patent Law

(57) ABSTRACT

A luminaire controller includes a controller housing, a user interface panel, a power interface, a load interface, a power control module and an illumination control module. The user interface panel, power interface and load interface extend from the controller housing. The power interface and load interface are disposed within the controller housing, and are electrically coupled to the user interface panel. The power control module is configured to electrically connect the load interface to the power interface upon receipt of a connect signal from the user interface panel, and electrically isolate the load interface from the power interface upon receipt of a disconnect signal from the user interface panel. In accordance with a light characteristic signal that is received from the user interface panel, the illumination control module is configured to wirelessly control a characteristic of light emitted by a luminaire that is electrically coupled to the load interface.

11 Claims, 9 Drawing Sheets

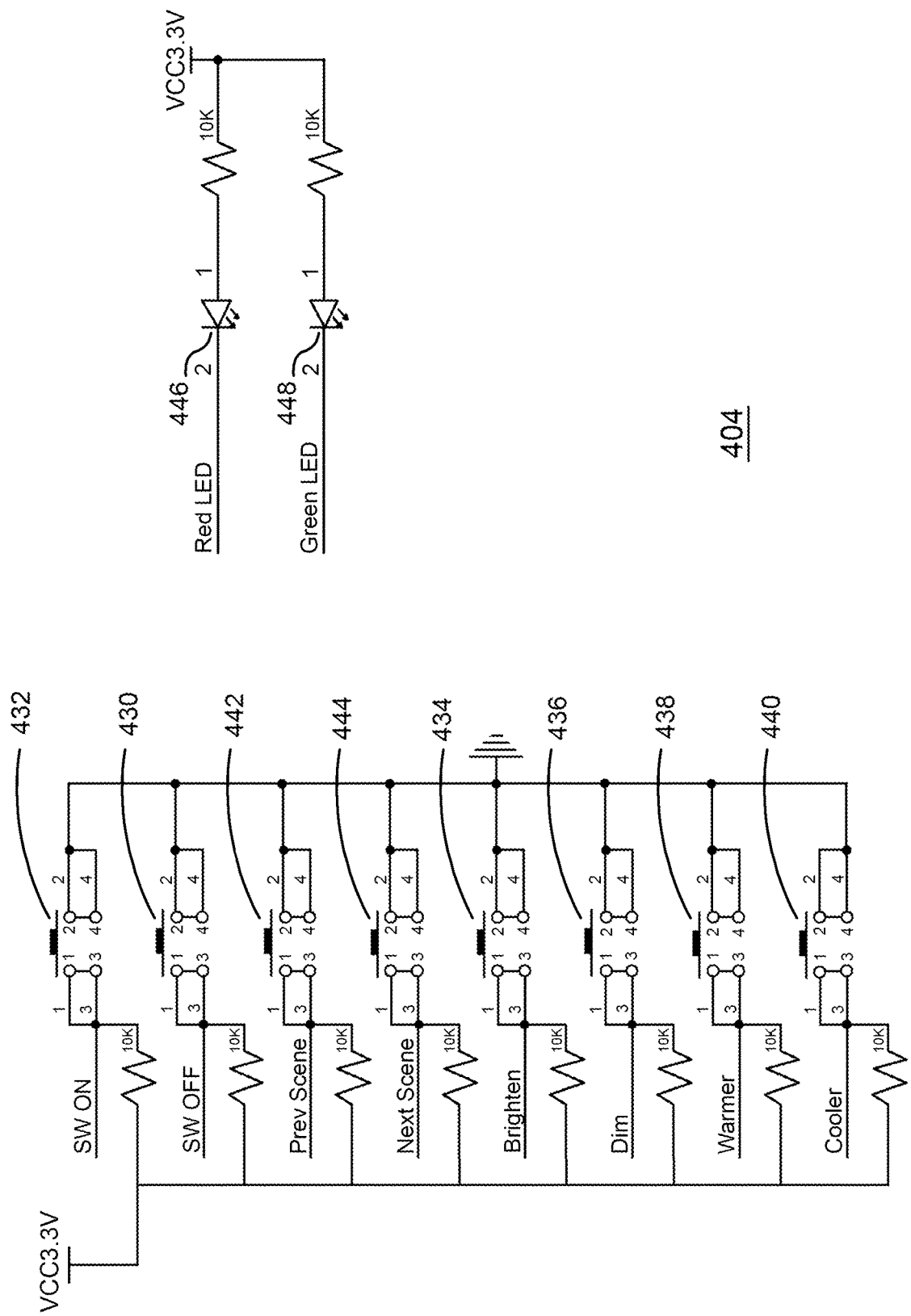
FIG. 5.1

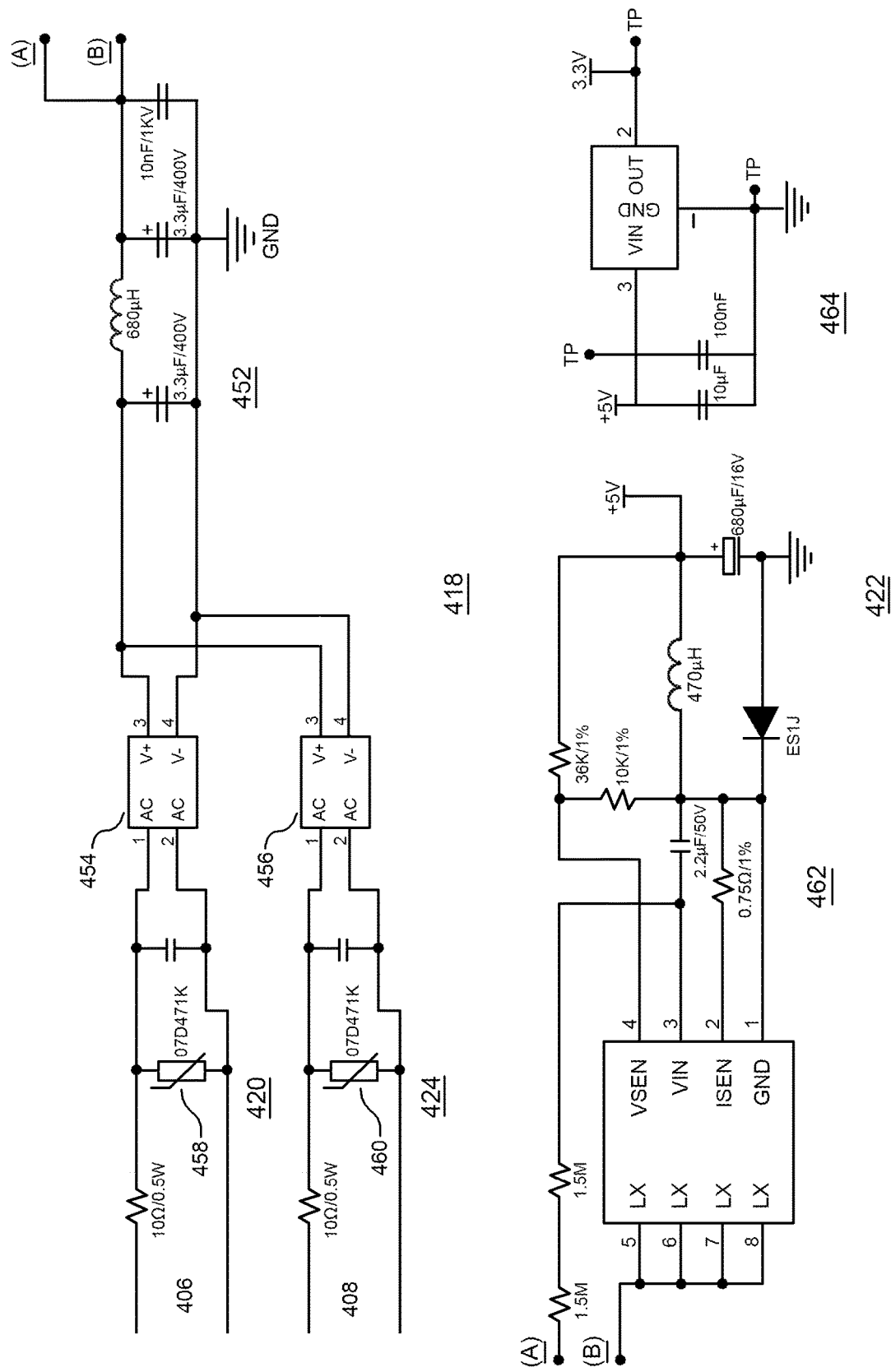
FIG 5.2

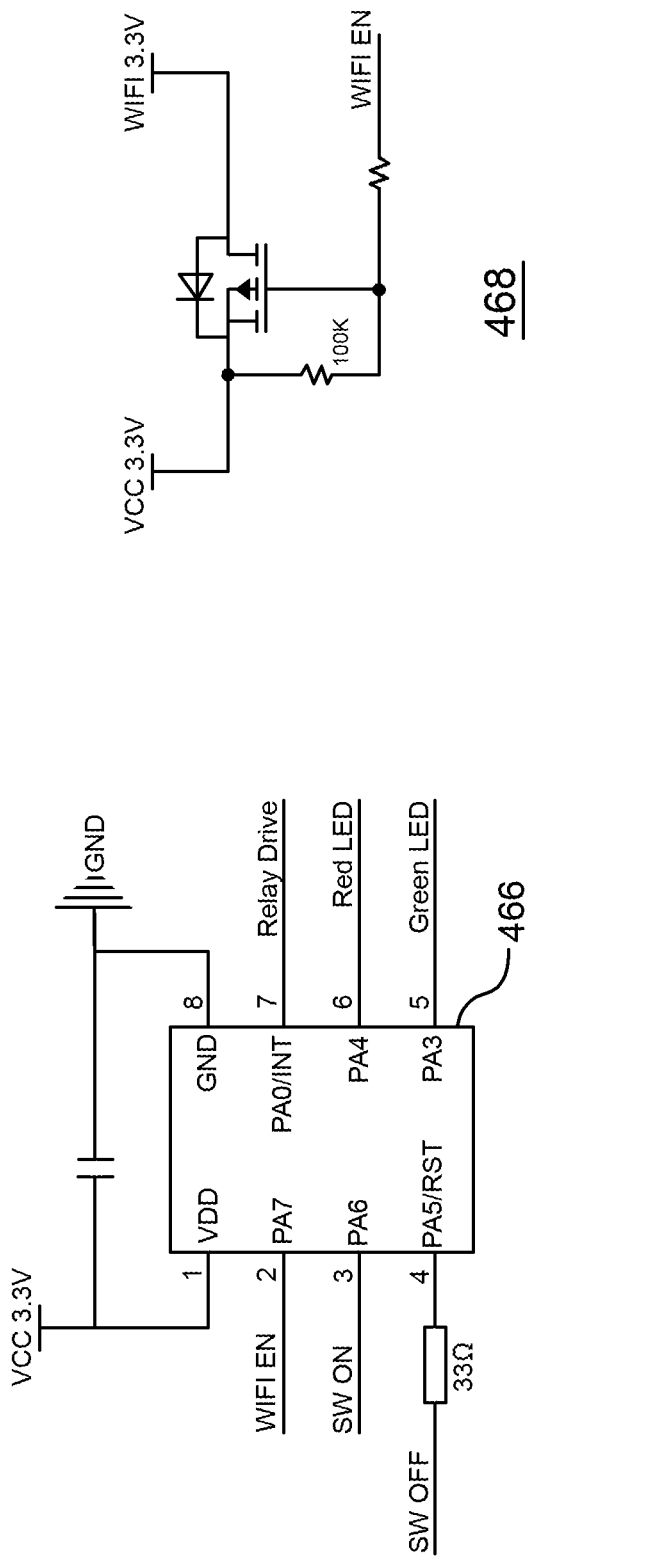
FIG. 5.3

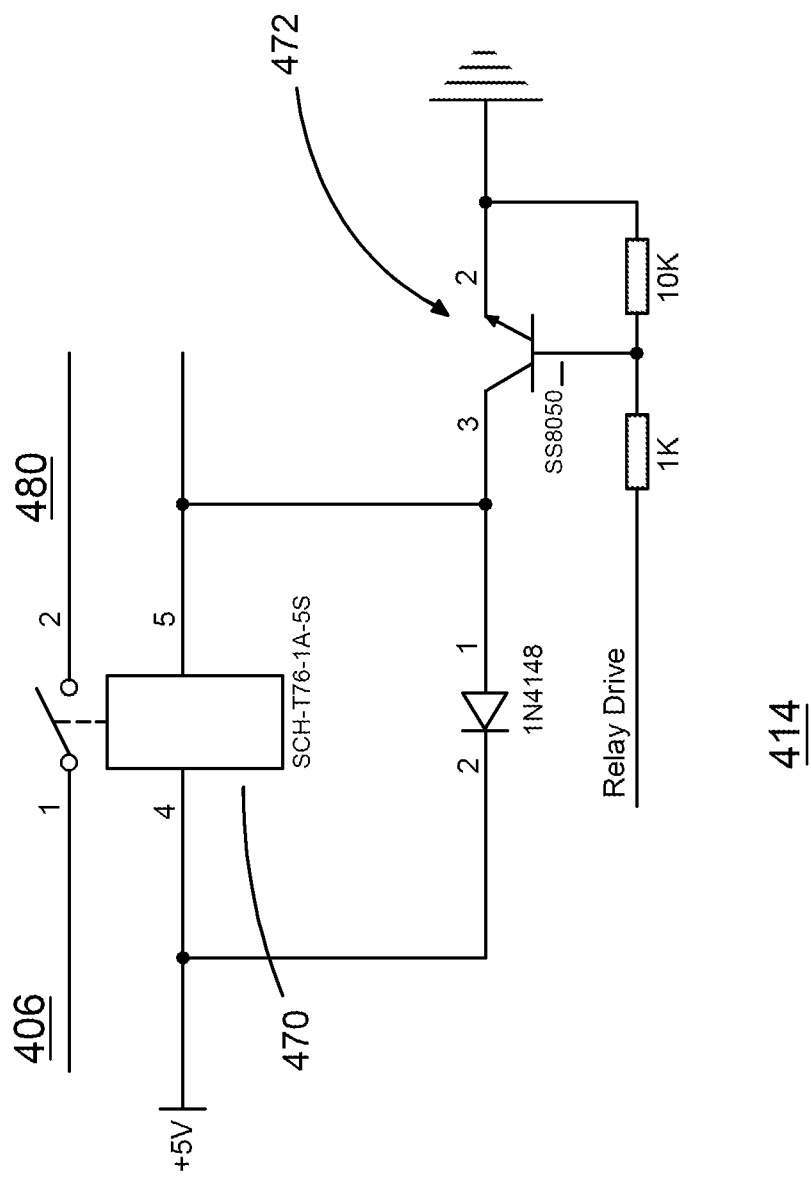
FIG. 5.4

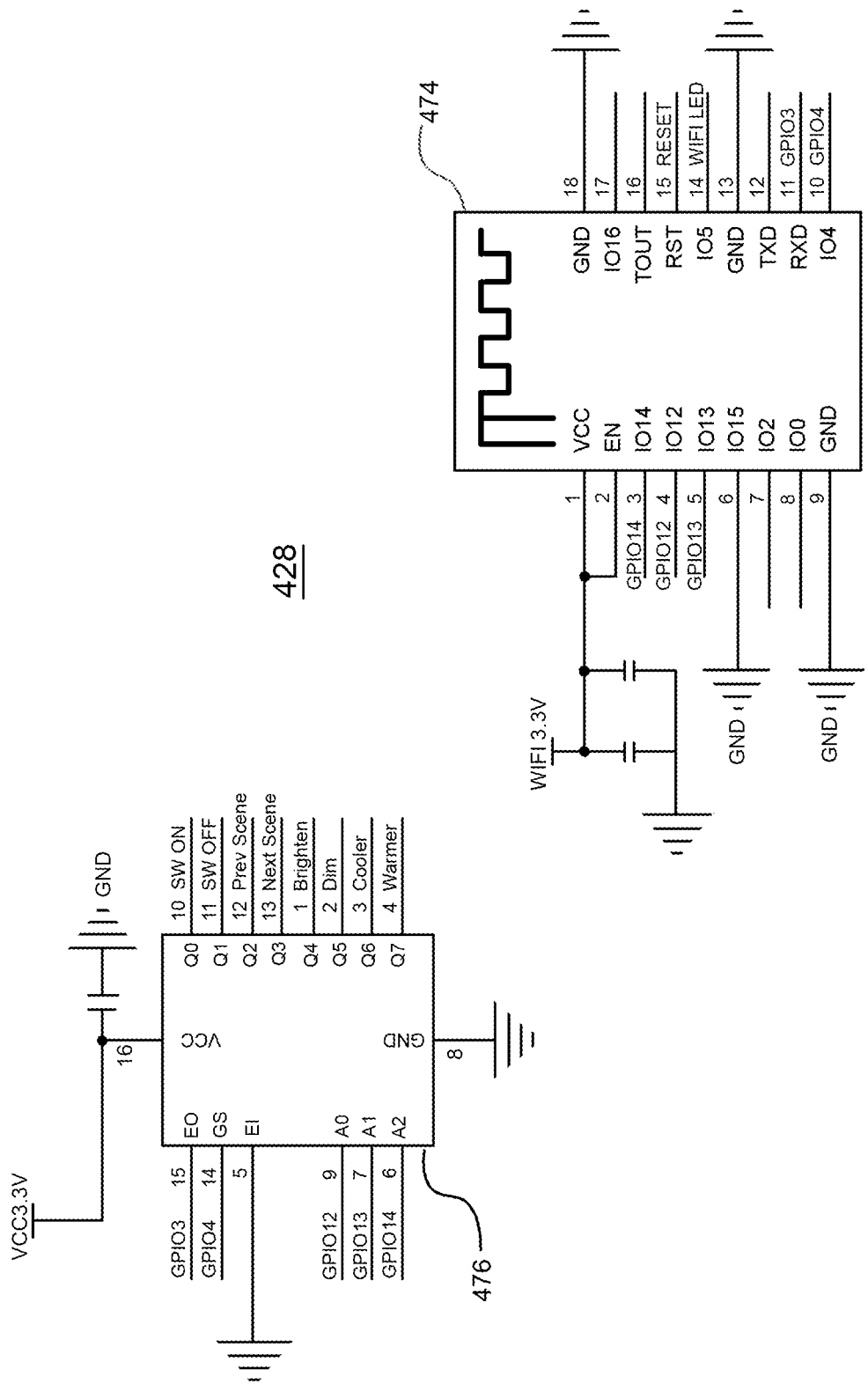
FIG. 5.5

LUMINAIRE CONTROLLER AND METHOD OF CONTROLLING A LUMINAIRE

FIELD

This patent application relates to a controller and method for controlling a luminaire.

BACKGROUND

Luminaires may communicate with a wireless controller via a local-area WiFi network. The wireless controller may transmit luminance commands to the luminaires via the WiFi network, and the luminaires may alter their luminance output based on the transmitted luminance commands. For example, the wireless controller may transmit a colour command that instructs the luminaires on the WiFi network to adjust the colour of the light produced by the luminaires. The wireless controller may also transmit an intensity command that instructs the luminaires to adjust the intensity of the light produced by the luminaires.

In the latter situation, the intensity command may instruct the luminaires to reduce the intensity of the light produced to a minimum intensity level. However, the luminaires must receive power from their power source in order to process any subsequent luminance commands. Therefore, luminaires still consume power even when the intensity of the light produced by the luminaires is at the luminaires' minimum intensity level (i.e. the luminaires appear to be "off").

SUMMARY

This patent application discloses a luminaire controller, method of controlling a luminaire, and a luminaire network in which the luminaires may be electrically connected to, and electrically isolated from, their power source upon receipt of user commands input into the luminaire controller.

The luminaire controller may include a controller housing, a user interface panel, a power interface, a load interface, a power control module and an illumination control module. The user interface panel, power interface and load interface extend from the controller housing. The power interface and load interface are disposed within the controller housing, and are electrically coupled to the user interface panel.

The power control module is configured to receive a connect signal from the user interface panel, and to electrically connect the load interface to the power interface upon receipt of the connect signal. The power control module is also configured to receive a disconnect signal from the user interface panel, and to electrically isolate the load interface from the power interface upon receipt of the disconnect signal.

The illumination control module is configured to receive a light characteristic signal from the user interface panel. In accordance with the light characteristic signal, the illumination control module is configured to wirelessly control a characteristic of light emitted by a luminaire that is electrically coupled to the load interface.

The method of controlling a luminaire involves a luminaire controller receiving a connect signal from a user interface panel of the luminaire controller, and electrically coupling a luminaire to a power source upon receiving the connect signal. The luminaire controller may receive a disconnect signal from the user interface panel, and electrically isolate the luminaire from the power source upon receiving the disconnect signal. The luminaire controller may also receive a light characteristic signal from the user interface panel, and wirelessly control a characteristic of light emitted by the luminaire in accordance with the light characteristic signal.

The luminaire network includes a power source, and a luminaire controller that is coupled to the power source. The luminaire controller is configured to receive a connect signal from a user interface panel of the luminaire controller, and to electrically couple a luminaire to the power source upon receipt of the connect signal. The luminaire controller is configured to receive a disconnect signal from the user interface panel, and to electrically isolate the luminaire from the power source upon receipt of the disconnect signal. The luminaire controller may also be configured to receive a light characteristic signal from the user interface panel, and to wirelessly control a characteristic of light emitted by the luminaire in accordance with the light characteristic signal.

In one implementation, the power control module of the luminaire controller is configured to receive a pair signal from the user interface panel, and to trigger the luminaire to wirelessly pair with a wireless router upon receipt of the pair signal. The illumination control module may be configured to control the characteristic of light by transmitting an illumination command to the luminaire via a wireless communications path that excludes the wireless router.

The power control module may trigger the luminaire to wirelessly pair with the wireless router by cyclically (i) electrically connecting the load interface to the power interface and (ii) electrically isolating the load interface from the power interface upon, receipt of the pair signal from the user interface panel. Therefore, the luminaire controller may trigger the luminaire to wireless pair with the wireless router by cyclically (i) electrically coupling the luminaire to the power source and (ii) electrically isolating the luminaire from the power source, upon receiving the pair signal.

Since the power control module of the luminaire controller allows the user to electrically isolate the luminaires from the power source upon demand, the luminaire controller can reduce the power consumed by the luminaires in comparison to conventional luminaire installations. Since the power control module may also cyclically electrically couple the luminaires to and electrically isolate the luminaires from the power source, the luminaire controller can command the luminaires to wirelessly pair with the wireless router. Further, since the illumination control module and the power control module are controlled via a singular user interface panel, the solution described herein provides the user with full control over the luminaires without recourse to a separate wall switch or circuit breaker to electrically isolate the luminaires from the power source or to pair the luminaires with the wireless router.

Further, since the luminaire controller includes both the power control module and the illumination control module, the power control module and the illumination control can be conveniently installed together within a single electrical junction box. Therefore, the luminaire controller reduces the likelihood of electrical wiring errors being introduced in the luminaire network described herein in comparison to conventional luminaire networks.

BRIEF DESCRIPTION OF THE DRAWINGS

An exemplary luminaire network, luminaire controller and method of controlling a luminaire will now be described, with reference to the accompanying drawings, in which:

FIGS. 5.1-5.5 together comprise a detailed schematic diagram of the exemplary luminaire controller.

DETAILS

1. Luminaire Network—Overview

Figure 1:
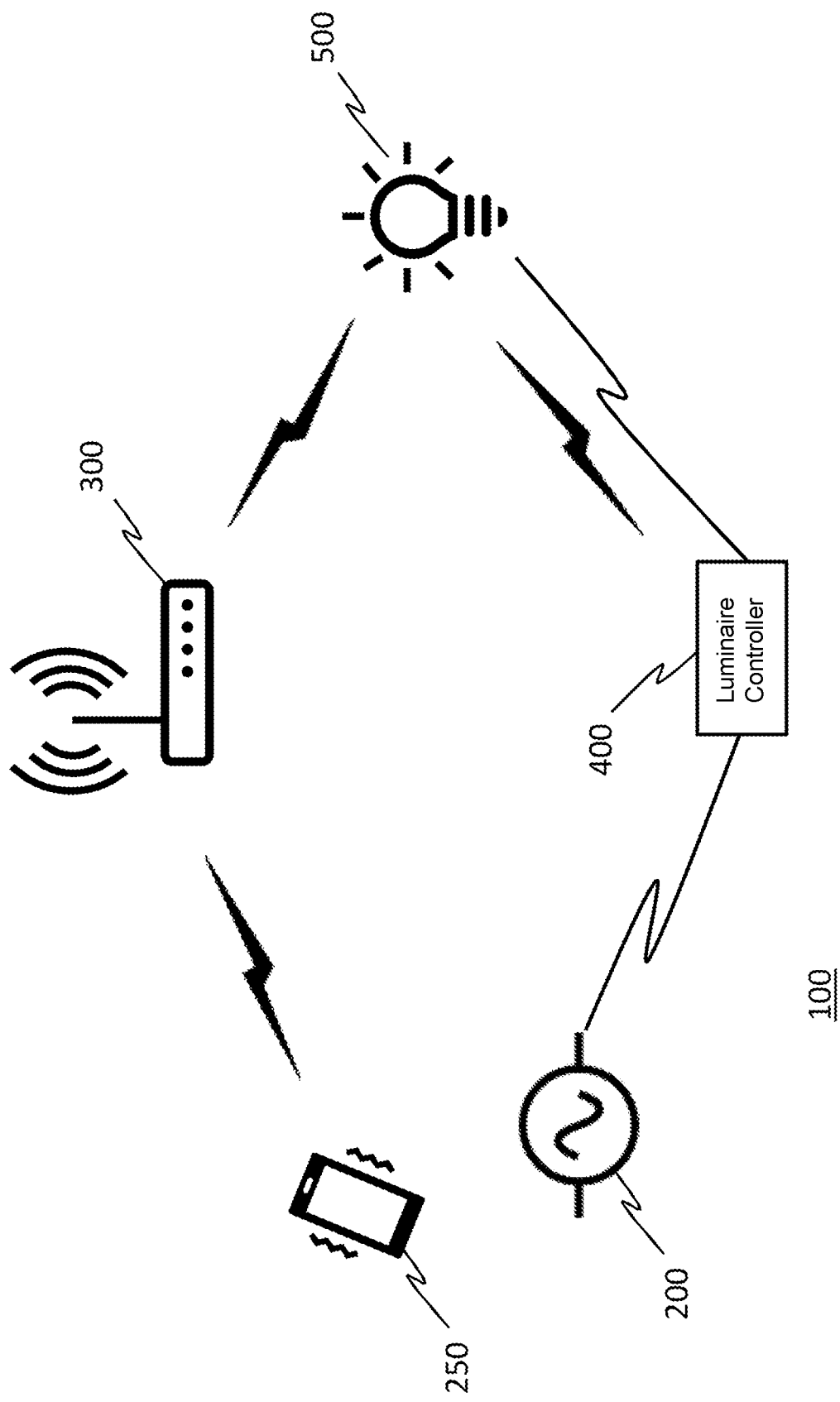
FIG. 1 is a schematic view of the luminaire network interfacing with at least one luminaire.

FIG. 1 is a schematic view of a luminaire network, denoted generally as 100. As shown, the luminaire network 100 includes a power source 200, a portable wireless controller 250, a wireless router 300 and a luminaire controller 400. Although the luminaire network 100 is shown communicating with a single luminaire 500, it should be understood that the luminaire network 100 may simultaneously communicating with multiple luminaires 500.

The power source 200 is typically an alternating current (AC) power source of sufficient voltage to power the luminaires 500.

The portable wireless controller 250 may control the characteristics of the light emitted by the luminaires 500, by wirelessly transmitting light characteristic commands to the luminaires 500, via the wireless router 300. Therefore, the portable wireless controller 250 is a wireless communications device that is at least capable of wireless communications with the luminaires 500, via the wireless router 300.

The wireless controller 250, the wireless router 300 and the luminaires 500 typically communicate with the one another using IEEE 802.11 b/g/n WiFi protocols. Therefore, the wireless controller 250 may be implemented as a WiFi-enabled smartphone, as an example. However, the solution described herein is not limited to any particular WiFi protocol or any particular wireless protocol.

The luminaire controller 400 also controls the characteristics of the light emitted by the luminaires 500, by wirelessly transmitting light characteristic commands to the luminaires 500. Since the luminaires 500 typically implement IEEE 802.11 b/g/n WiFi protocols, the luminaire controller 400 typically communicates with the luminaires 500 via IEEE 802.11 b/g/n WiFi protocols. However, in contrast to the wireless controller 250, the luminaire controller 400 transmits its light characteristic commands directly to the luminaires 500 (i.e., via a wireless communications path that excludes the wireless router 300).

As shown, the router 300 and the luminaire controller 400 are both coupled to the AC power source 200, e.g., via conventional electrical wire cable. Therefore, the router 300 and the luminaire controller 400 both receive power from the AC power source 200.

The luminaires 500 are typically smart wireless LED luminaires, and are configured to alter the characteristics of the light emitted therefrom based on the light characteristic commands that the luminaires 500 receive from the wireless controller 250 and the luminaire controller 400. The luminaires 500 may be IEEE 802.15.4 compliant, and are physically coupled to the luminaire controller 400, e.g., via conventional electrical wire cable. As will be explained below, in addition to controlling the characteristics of the light emitted by the luminaires 500, the luminaire controller 400 selectively electrically couples the luminaires 500 to the AC power source 200. Therefore, the luminaires 500 selectively receive power from the AC power source, upon command from the luminaire controller 400.

2. Luminaire Controller—Overview

Figure 3:
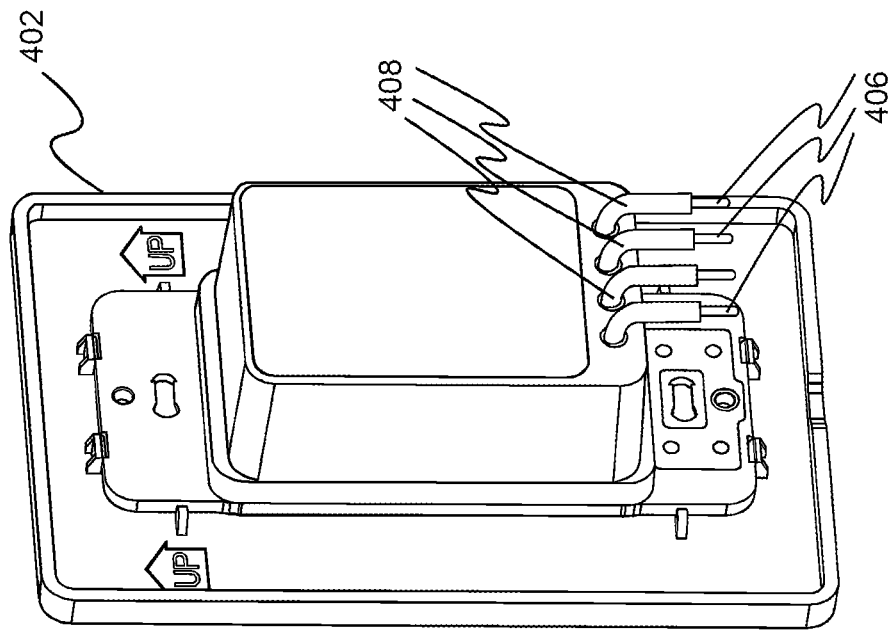
FIG. 3 is a rear perspective view of the luminaire controller.
Figure 2:
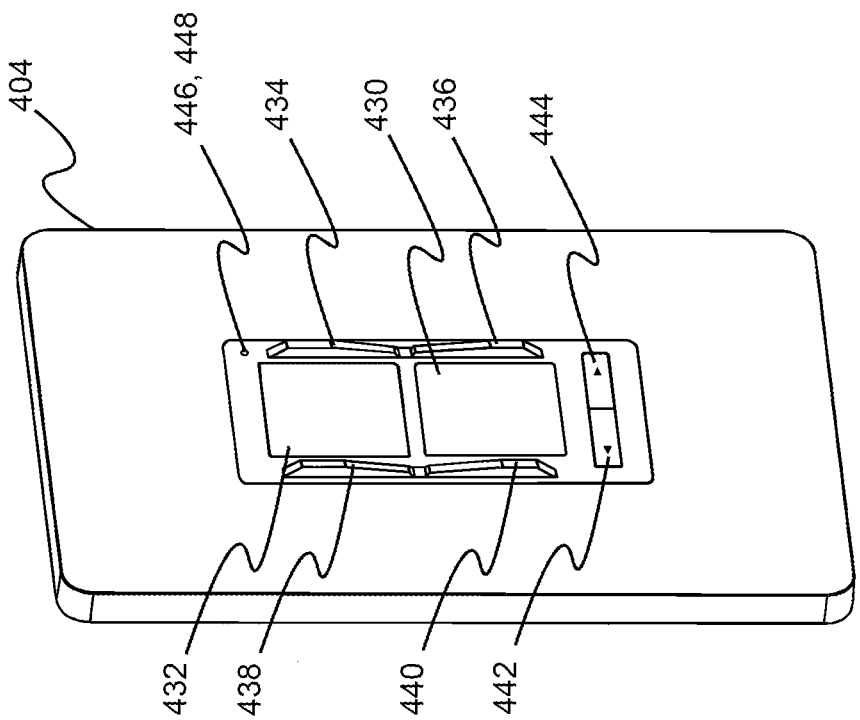
FIG. 2 is a front perspective view of the luminaire controller.

As shown in FIGS. 2 and 3, the luminaire controller 400 includes a controller housing 402, a user interface panel 404, a power interface 406, and a load interface 408. The user interface panel 404 will be discussed in detail in the section entitled "Luminaire Controller—Detailed Discussion". However, at this preliminary point of the description, it is sufficient to simply note that the user interface panel 404 extends from one side of the controller housing 402.

The power interface 406 and the load interface 408 extend from the opposite side of the controller housing 402. As shown, the power interface 406 may include three wires (e.g. black, neutral, ground), and the load interface 408 may likewise include three wires (e.g. red, neutral, ground). As will be explained, when the luminaire controller 400 is installed in the luminaire network 100, the luminaire controller 400 is electrically coupled to the AC power source 200 via the power interface 406, and is electrically coupled to the luminaires 500 via the load interface 408.

The luminaire controller 400 also includes a power control module 410 and an illumination control module 412. However, the power control module 410 and the illumination control module 412 are disposed within the controller housing 402, and, therefore, are not visible in FIGS. 2 and 3.

Figure 4:
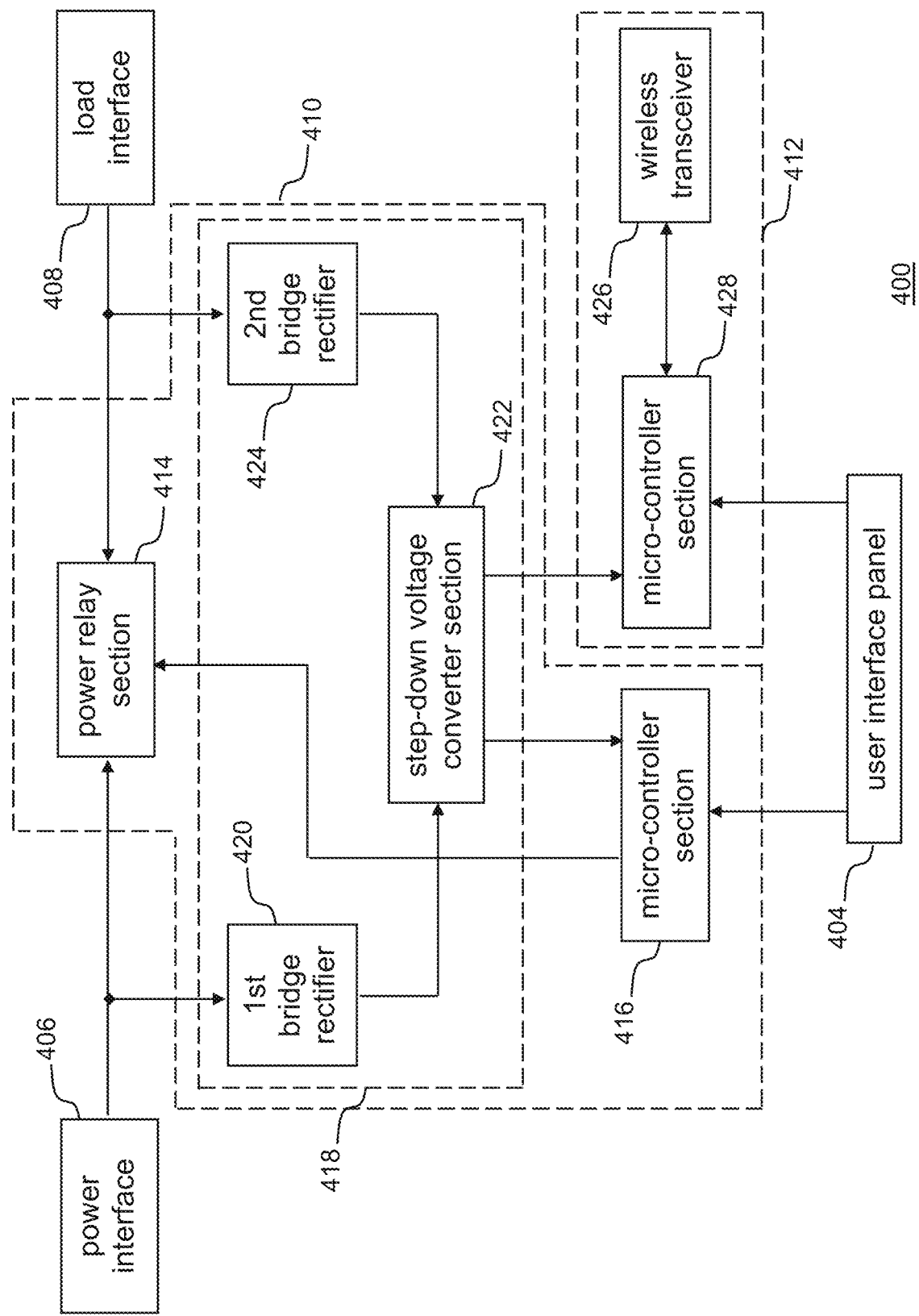
FIG. 4 is block diagram depicting the functionality implemented by an exemplary luminaire controller.

Turning to FIG. 4, the power control module 410 is shown electrically coupled to the user interface panel 404. The power control module 410 is configured to electrically connect the load interface 408 to the power interface 406 upon receipt of a "connect" signal from the user interface panel 404, and to electrically isolate the load interface 408 from the power interface 406 upon receipt of a "disconnect" signal from the user interface panel 404.

The power control module 410 may also be configured to trigger the luminaires 500 to wirelessly pair with the wireless router 300, upon receipt of a "pair" signal from the user interface panel 404. The power control module 410 may be configured to trigger the luminaires 500 to wirelessly pair by cyclically (i) electrically connecting the load interface 408 to the power interface 406, and (ii) electrically isolating the load interface 408 from the power interface 406, upon receipt of the "pair" signal. As will be explained, cyclically electrically connecting/disconnecting the load interface 408 to the power interface 406 cyclically (i) couples the luminaires 500 to the power source 200 and (ii) isolates the luminaires 500 from the power source 200, and thereby cyclically applies power to (and removes power from) the luminaires 500.

As shown in FIG. 4, the power control module 410 includes a power relay section 414, a microcontroller section 416, and a AC/DC converter section 418.

The power relay section 414 is coupled to the microcontroller section 416, the power interface 406 and the load interface 408. The power relay section 414 is controlled by the microcontroller section 416, and is configured to selectively (i) connect the load interface 408 to the power interface 406, and (ii) isolate the load interface 408 from the power interface 406, in accordance with the signals (e.g. "connect", "disconnect", "pair") received at the microcontroller section 416 from the user interface panel 404.

The microcontroller section 416 is coupled to the user interface panel 404, and processes the signals (e.g. "connect", "disconnect", "pair") that it receives from the user interface panel 404.

As discussed, the power control module 410 is configured to electrically connect the load interface 408 to the power interface 406 upon receipt of a "connect" signal from the user interface panel 404, and to electrically isolate the load interface 408 from the power interface 406 upon receipt of a "disconnect" signal from the user interface panel 404. Therefore, the microcontroller section 416 is configured to command the power relay section 414 to connect the load interface 408 to the power interface 406 when the microcontroller section 416 receives the "connect" signal from the user interface panel 404, and is configured to command the power relay section 414 to isolate the load interface 408 from the power interface 406 when the microcontroller section 416 receives the "disconnect" signal from the user interface panel 404.

Further, as discussed, the power control module 410 may be configured to cyclically (i) electrically connect the load interface 408 to the power interface 406, and (ii) electrically isolate the load interface 408 from the power interface 406, upon receipt of a "pair" signal from the user interface panel 404. Therefore, the microcontroller section 416 may also be configured to command the power relay section 414 to cyclically (i) connect the load interface 408 to the power interface 406 and (ii) isolate the load interface 408 from the power interface 406, when the microcontroller section 416 receives the "pair" signal from the user interface panel 404.

The AC/DC converter section 418 is coupled to the power interface 406, the illumination control module 412 and the microcontroller section 416. The AC/DC converter section 418 receives AC power from the AC power source 200, via the power interface 406, and supplies DC power to the illumination control module 412 and to the microcontroller section 416.

As shown, the AC/DC converter section 418 may include a first full-wave bridge rectifier 420, and a step-down voltage converter section 422. The first full-wave bridge rectifier 420 is coupled, at its AC input, to the power interface 406. The step-down voltage converter section 422 is coupled, at its input, to the DC output of the first full-wave bridge rectifier 420, and is coupled, at its output, to the power supply inputs of the illumination control module 412 and the microcontroller section 416.

As also shown, optionally the AC/DC converter section 418 may also include a second full-wave bridge rectifier 424 that is coupled, at its AC input, to the load interface 408. The step-down voltage converter section 422 may also be coupled, at its input, to the DC output of the second full-wave bridge rectifier 424. This variation allows the power source 200 to be connected to either one of the two interfaces 406, 408, and allows the luminaires 500 to be connected to the other of the two interfaces 406, 408.

As shown in FIG. 4, the illumination control module 412 is electrically coupled to the user interface panel 404. The illumination control module 412 is configured to wirelessly control characteristics of light emitted by the luminaires 500, in accordance with "light characteristic" signals received from the user interface panel 404.

As shown, the illumination control module 412 includes a wireless transmitter/receiver 426 and a microcontroller section 428. As discussed, the luminaires 500 typically implement IEEE 802.11 b/g/n WiFi protocols. Therefore, the wireless transmitter/receiver 426 may wirelessly control the characteristics of light emitted by the luminaires 500 by transmitting light characteristic commands to the luminaires 500, using IEEE 802.11 b/g/n WiFi protocols. However, as discussed, the luminaire controller 400 transmits its light characteristic commands directly to the luminaires 500. Therefore, the wireless transmitter/receiver 426 transmits the light characteristic commands to the luminaires 500 via a wireless communications path that excludes the wireless router 300.

The microcontroller section 428 is coupled to the user interface panel 404 and to the wireless transmitter/receiver 426. The microcontroller section 428 receives light characteristic signals from the user interface panel 404, and wirelessly transmits the corresponding light characteristic commands to the luminaires 500 via the wireless transmitter/receiver 426. Although, the wireless transmitter/receiver 426 is shown in FIG. 4 as being external to the microcontroller section 428, in one variation the wireless transmitter/receiver 426 is integrated into the microcontroller section 428.

As will be discussed in further detail, possible "light characteristic" signals received from the user interface panel 404 include, but are not limited to, a "brighter" signal, a "dimmer" signal, a "warmer" signal, a "cooler" signal, a "previous scene" signal, and a "next scene" signal.

3. Luminaire Controller—Detailed Discussion 3.1. User Interface Panel

Turning now to FIG. 5.1, the user interface panel 404 is shown incorporating a plurality of user-operable keys. As shown in FIG. 5.1 (and in FIG. 2), the user-operable keys include an "off" key 430 and an "on" key 432. In the embodiment of FIG. 5.1 (see also FIG. 5.3), the "off" key 430 and the "on" key 432 are electrically coupled to respective data inputs of the microcontroller unit 466 (of the power control module 410) and to respective data inputs of the microcontroller unit 474 (of the illumination control module 412).

In addition to the "off" key 430 and the "on" key 432, the user-operable keys may also include keys for controlling characteristics of the light emitted by the luminaires 500. As discussed above, possible "light characteristic" signals received from the user interface panel 404 include, but are not limited to, a "brighter" signal, a "dimmer" signal, a "warmer" signal, a "cooler" signal, a "previous scene" signal, and a "next scene" signal. Therefore, in the embodiment of FIG. 5.1 (and FIG. 2), the user-operable keys include a "brighter" key 434, a "dimmer" key 436, a "warmer" key 438, a "cooler" key 440, a "previous scene" key 442, and a "next scene" key 444. In this embodiment, these latter keys 434, 436, 438, 440, 442, 444 are only electrically coupled to respective data inputs of the microcontroller section 428 (of the illumination control module 412).

The user interface panel 404 may also include a plurality of notification lamps that extend through an aperture in the panel and notify the operator of the operational mode (e.g. "isolated" mode, "connected" mode, "pairing" mode) of the luminaire controller 400. In the embodiment shown, the notification lamps include a "disconnected" red LED 446 and a "connected" green LED 448.

3.2. Power Control Module: AC/DC Converter Section

As shown in the embodiment of FIG. 5.2, the AC/DC converter section 418 (of the power control module 410) includes the first full-wave bridge rectifier 420, the second full-wave bridge rectifier 424, a power filter section 452, and the step-down voltage converter section 422. The first full-wave bridge rectifier 420 is coupled, at its AC input, to the power interface 406. The second full-wave bridge rectifier 424 is coupled, at its AC input, to the load interface 408. The DC outputs of the bridge rectifiers 420, 424 are connected, in parallel, to the power inputs of the power filter section 452.

In the embodiment shown, the first full-wave bridge rectifier 420 includes a first on-chip full-wave bridge rectifier circuit 454, and a varistor 458 connected across the AC power inputs of the first bridge rectifier circuit 454. Similarly, the second full-wave bridge rectifier 424 includes a second on-chip full-wave bridge rectifier circuit 456, and a varistor 460 connected across the AC power inputs of the second bridge rectifier circuit 456.

The varistors 458, 460 suppress voltage transients that may be carried by the AC voltage source 200, and may be implemented using TYEE 07D471K varistors, as an example. The bridge rectifier circuits 454, 456 convert the AC voltage (e.g. 120 v), provided by the AC power source 200, into a DC voltage, and may be implemented using Diodes Incorporated MB10F rectifiers, as an example. The power filter section 452 filters out high frequencies from the DC voltage that is provided by the bridge rectifier circuits 454, 456.

The step-down voltage converter section 422 is connected to the DC power output of the power filter section 452. In the embodiment shown in FIG. 5.2, the step-down voltage converter section 422 includes a first DC voltage regulator 462, and a second DC voltage regulator 464 coupled to the DC output of the first DC voltage regulator 462.

The first DC voltage regulator 462 provides a DC output voltage (e.g. 5 v) that is lower than that provided by the bridge rectifier circuits 454, 456, and supplies power to electrical components that require such a lower output voltage (e.g. power relay section 414). The first DC voltage regulator 462 may be implemented using a Silergy Corporation SY50282 5 v DC buck regulator, as an example.

The second DC voltage regulator 464 provides a DC output voltage (e.g. 3.3 v) that is lower than that provided by the first DC voltage regulator 462, and supplies power to electrical components that require such a lower output voltage (e.g. user interface panel 404, microcontroller section 416, wireless transmitter/receiver section 426, microcontroller section 428). The second DC voltage regulator 464 may be implemented using an Advanced Monolithic Systems AMS1117 3.3 v DC voltage regulator, as an example.

3.3. Power Control Module: Microcontroller Section

As shown in FIG. 5.3, the microcontroller section 416 (of the power control module 410) includes a microcontroller unit 466, and a WiFi power switch 468. In the embodiment shown, the microcontroller unit 466 may be implemented using a Padauk Technology PMC150 8-bit OTP (One Time Programmable) Type IO Controller, as an example.

The WiFi power switch 468 is connected in series with the (3.3 v) DC voltage output of the second DC voltage regulator 464 and a power supply input of the illumination control module 412 (e.g. Vcc input of the microcontroller unit 466), and is controlled by a signal output of the microcontroller unit 466. Therefore, the WiFi power switch 468 selectively (i) isolates the illumination control module 412 from the second DC voltage regulator 464, and (ii) applies power to the illumination control module 412 via the second DC voltage regulator 464, upon command from the microcontroller unit 466.

As discussed, the microcontroller section 416 is configured to command the power relay section 414 (of the power control module 410) to isolate the load interface 408 from the power interface 406 when the microcontroller section 416 receives the "disconnect" signal from the user interface panel 404. In the embodiment of FIG. 5.3, the microcontroller section 416 is configured to interpret a sustained actuation of the "off" key 430 as a "disconnect" signal. Therefore, the microcontroller unit 466 is programmed to command the power relay section 414 to isolate the load interface 408 from the power interface 406 when the microcontroller unit 466 receives a "disconnect" signal from the user interface panel 404 (e.g. when the microcontroller unit 466 determines that the "off" key 430 has been pressed for a period of at least 5 seconds).

The microcontroller unit 466 is also programmed to command the WiFi power switch 468 to isolate the illumination control module 412 from the second DC voltage regulator 464 when the microcontroller unit 466 receives the "disconnect" signal from the user interface panel 404. The microcontroller unit 466 may also be programmed to illuminate the "disconnected" LED 446 (and extinguish the "connected" LED 448), and thereby notify the operator that the luminaire controller 400 has entered the "isolated" mode, when the microcontroller unit 466 receives the "disconnect" signal from the user interface panel 404.

As discussed, the microcontroller section 416 is configured to command the power relay section 414 to connect the load interface 408 to the power interface 406 when the microcontroller section 416 receives the "connect" signal from the user interface panel 404. In the embodiment of FIG. 5.3, the microcontroller section 416 is configured to interpret a sustained actuation of the "on" key 432 as a "connect" signal. Therefore, the microcontroller unit 466 is programmed to command the power relay section 414 to connect the load interface 408 to the power interface 406 when the microcontroller unit 466 receives a "connect" signal from the user interface panel 404 (e.g. when the microcontroller unit 466 determines that the "on" key 432 has been pressed for a period of at least 5 seconds).

The microcontroller unit 466 is also programmed to command the WiFi power switch 468 to apply power to the illumination control module 412, via the second DC voltage regulator 464, when the microcontroller unit 466 receives the "connect" signal from the user interface panel 404. The microcontroller unit 466 may also be programmed to illuminate the "connected" LED 448 (and extinguish the "disconnected" LED 446), and thereby notify the operator that the luminaire controller 400 has entered the "connected" mode, when the microcontroller unit 466 receives the "connect" signal from the user interface panel 404.

Further, as discussed, the microcontroller section 416 may be configured to command the power relay section 414 to cyclically (i) isolate the load interface 408 from the power interface 406 and (ii) connect the load interface 408 to the power interface 406, when the microcontroller section 416 receives the "pair" signal from the user interface panel 404. Cyclically applying power to, and removing power from, the luminaires 500 (by cyclically isolating/connecting the load interface 408 from/to the power interface 406) commands the luminaires 500 to wirelessly pair with the wireless router 300.

The microcontroller section 416 may be configured to interpret a simultaneous sustained actuation of the "off" key 430 and the "on" key 432) as a "pair" signal. The luminaires 500 may be configured to interpret consecutive power connect/disconnect cycles as a command directing the luminaires 500 to wirelessly pair with the illumination control module 412. Therefore, the microcontroller unit 466 may be programmed to cyclically command the power relay section 414 to (i) connect the load interface 408 to the power interface 406 and (ii) isolate the load interface 408 from the power interface 406, when the microcontroller unit 466 receives a "pair" signal from the user interface panel 404 (e.g. when the microcontroller unit 466 determines that the "off" key 430 and the "on" key 432 have been pressed simultaneously for a period of at least 5 seconds).

The microcontroller unit 466 may also be programmed to command the WiFi power switch 468 to apply power to the illumination control module 412, via the second DC voltage regulator 464, when the microcontroller unit 466 receives the "pair" signal from the user interface panel 404. The microcontroller unit 466 may also be programmed to cyclically illuminate and extinguish the "connected" LED 448 (and extinguish the "disconnected" LED 446), and thereby notify the operator that the luminaire controller 400 has entered the "pairing" mode, when the microcontroller unit 466 receives the "pair" signal from the user interface panel 404.

In order to provide some flexibility in the wireless pairing process, the microcontroller section 416 may be configured to implement different wireless pairing procedures depending upon whether the luminaries 500 have previously paired with the wireless router 300. Therefore, in the embodiment of FIG. 5.3, the microcontroller section 416 may receive from the user interface panel 404 a "pair setup" signal (i.e. a signal requesting that the luminaire controller 400 notify the operator that the luminaire controller 400 has entered "pairing" mode), followed by a "re-pair initiate" signal (i.e. a signal requesting all of the luminaires 500 that have previously paired with the wireless router 300 to wirelessly re-pair with the wireless router 300). Alternately, the microcontroller section 416 may receive from the user interface panel 404 the "pair setup" signal, followed by a "full pair initiate" signal (i.e. a signal requesting all of the luminaires 500 to wirelessly pair with the wireless router 300, whether or not the luminaires 500 had previously paired with the wireless router 300).

In the embodiment of FIG. 5.3, the microcontroller section 416 is configured to interpret a simultaneous sustained actuation of the "off" key 430 and the "on" key 432) as the "pair setup" signal. Therefore, in the embodiment shown, the microcontroller unit 466 may be programmed to simply cyclically illuminate and extinguish the "connected" LED 448 (and extinguish the "disconnected" LED 446), and thereby notify the operator that the luminaire controller 400 has entered the "pairing" mode, when the microcontroller unit 466 receives the "pair setup" signal from the user interface panel 404 (e.g. when the microcontroller unit 466 determines that the "off" key 430 and the "on" key 432 have been pressed simultaneously for a period of at least 5 seconds).

In the embodiment shown, the microcontroller section 416 may also be configured to interpret a brief actuation of the "on" key 432, after entering the "pairing" mode, as the "re-pair initiate" signal. The luminaires 500 may be configured to interpret three (3) consecutive power connect/disconnect cycles as a command directing the luminaires 500 (that have previously paired with the wireless router 300) to wirelessly re-pair with the wireless router 300. Therefore, in the embodiment shown, the microcontroller unit 466 may be programmed to cyclically command the power relay section 414 to (i) connect the load interface 408 to the power interface 406 and (ii) isolate the load interface 408 from the power interface 406, three (3) times when the microcontroller unit 466 receives a "re-pair initiate" signal from the user interface panel 404 (e.g. when the microcontroller unit 466 determines that the "off" key 430 and the "on" key 432 have been pressed simultaneously for a period of at least 5 seconds, and that the "on" key 432 has been pressed afterwards for a period of less than 2 seconds).

The microcontroller unit 466 may also be programmed to stop cyclically illuminating/extinguishing the "connected" LED 448 and instead continuously illuminate the "connected" LED 448 (and extinguish the "disconnected" LED 446), and thereby notify the operator that the luminaire controller 400 has exited "pairing" mode, when the microcontroller unit 466 receives the "re-pair initiate" signal from the user interface panel 404.

In the embodiment shown, the microcontroller section 416 may also be configured to interpret a sustained actuation of the "on" key 432, after entering the "pairing" mode, as a "full pair initiate" signal. The luminaires 500 may be configured to interpret five (5) consecutive power connect/disconnect cycles as a command directing all of the luminaires 500 to wirelessly pair with the wireless router 300, whether or not the luminaires 500 had previously paired with the wireless router 300. Therefore, in the embodiment shown, the microcontroller unit 466 may also be programmed to cyclically command the power relay section 414 to (i) connect the load interface 408 to the power interface 406 and (ii) isolate the load interface 408 from the power interface 406, five (5) times when the microcontroller unit 466 receives a "full pair initiate" signal from the user interface panel 404 (e.g. when the microcontroller unit 466 determines that the "off" key 430 and the "on" key 432 have been pressed simultaneously for a period of at least 5 seconds, and that the "on" key 432 has been pressed afterwards for a period of at least 2 seconds).

The microcontroller unit 466 may also be programmed to stop cyclically illuminating/extinguishing the "connected" LED 448 and instead continuously illuminate the "connected" LED 448 (and extinguish the "disconnected" LED 446), and thereby notify the operator that the luminaire controller 400 has exited "pairing" mode, when the microcontroller unit 466 receives the "full pair initiate" signal from the user interface panel 404.

As discussed, the portable wireless controller 250 may control the characteristics of the light emitted by the luminaires 500, via the wireless router 300. Therefore, after the luminaires 500 have (re-)paired with the wireless router 300 (e.g. after power to the luminaires 500 has been interrupted three/five consecutive times), the wireless controller 250 may control the characteristics of the light emitted by one or more of the luminaires 500 by transmitting light characteristic commands to the respective (paired) luminaires 500, via the wireless router 300.

3.4. Power Control Module: Power Relay Section

As shown in FIG. 5.4, the power relay section 414 (of the power control module 410) includes an electromagnetic relay 470 and a relay driver 472. In the embodiment shown, the electromagnetic relay 470 may be implemented using a SCH-T76-1A-5S relay, as an example.

The electromagnetic relay 470 is connected, at its switched outputs, in series with the power interface 406 and the load interface 408. Therefore, the electromagnetic relay 470 selectively (i) isolates the load interface 408 from the power interface 406 (when the coil circuit of the electromagnetic relay 470 is de-energized), and (ii) connects the load interface 408 to the power interface 406 (when the coil circuit of the electromagnetic relay 470 is energized), upon command from the microcontroller unit 466.

The relay driver 472 is coupled, at its current output, to the coil circuit of the electromagnetic relay 470, and is controlled by a signal output of the microcontroller unit 466. Therefore, the relay driver 472 selectively energizes/deenergizes the coil circuit of the electromagnetic relay 470 upon command from the microcontroller unit 466.

In the embodiment shown, the electromagnetic relay 446 is a normally-open relay. Therefore, if the power source 200 becomes temporarily interrupted (e.g. a power brownout), the electromagnetic relay 470 isolates the load interface 408 from the power interface 406 until the microcontroller unit 466 restarts and commands the relay driver 446 to close the electromagnetic relay 470. Accordingly, the electromagnetic relay 470 and the relay driver 472 provide the luminaires 500 with some protection from voltage transients that may otherwise be caused by a power brownout.

3.5. Illumination Control Module

In the embodiment shown in FIG. 5.5, the microcontroller section 428 (of the illumination control module 412) includes a microcontroller unit 474, and a priority encoder 476.

In the embodiment shown, the microcontroller unit 474 may be implemented using an Espressif ESP-WROOM-02D microcontroller, and the priority encoder 476 may be implemented using a Texas Instruments SN74HC148DR 8-line to 3-line priority encoder, as examples. Therefore, in the depicted embodiment, the microcontroller unit 474 includes the wireless transmitter/receiver 426.

The priority encoder 476 includes a plurality of input lines each connected to a respective one of the user-operable keys 430, 432, 434, 436, 438, 440, 442, 444 of the user interface panel 404, and provides the microcontroller unit 474 with an encoded digital output signal that identifies the key depressed.

Therefore, upon actuation of the "off" key 430, the priority encoder 476 outputs an encoded "off" signal to the microcontroller unit 474. The microcontroller section 428 is configured to terminate wireless communications with the luminaires 500, when the microcontroller section 428 receives the "off" signal from the user interface panel 404. Therefore, in the embodiment of FIG. 5.5, the microcontroller unit 474 is programmed to terminate wireless communications with the luminaires 500 when the microcontroller unit 474 receives an "off" signal from the priority encoder 476.

Similarly, upon actuation of the "on" key 432, for example, the priority encoder 476 outputs an encoded "on" signal to the microcontroller unit 474. The microcontroller section 428 is configured to initiate wireless communications with the luminaires 500, when the microcontroller section 428 receives the "on" signal from the user interface panel 404. Therefore, in the embodiment of FIG. 5.5, the microcontroller unit 474 is programmed to initiate wireless communications with the luminaires 500 when the microcontroller unit 474 receives an "on" signal from the priority encoder 476.

Further, as discussed, the power control module 410 may be configured to notify the operator that the luminaire controller 400 has entered "pairing" mode, upon receipt of a "pair setup" signal from the user interface panel 404 (e.g. when the microcontroller unit 466 determines that the "off" key 430 and the "on" key 432 have been pressed simultaneously for a period of at least 5 seconds). However, in the embodiment of FIG. 5.5, the priority encoder 476 is configured to give higher priority to the "on" key 432 than to the "off" key 430. Therefore, upon the simultaneous actuation of the "off" key 430 and the "on" key 432, the priority encoder 476 continues to output the encoded "on" signal to the microcontroller unit 474. Accordingly, in the embodiment shown, the illumination control module 412 maintains the wireless communications with the luminaires 500 when the power control module 410 receives the "pair setup" signal from the user interface panel 404.

Further, as discussed, the power control module 410 may be configured to command the power relay section 414 to cyclically connect/isolate the luminaires 500 to/from the power source 200 three (or five) times when the microcontroller unit 466 receives a "re-pair initiate" (or a "full pair initiate") signal from the user interface panel 404 (e.g. when the microcontroller unit 466 determines that the "on" key 432 has been pressed for a period of less than (or at least) 2 seconds, after determining that the "off" key 430 and the "on" key 432 have been pressed simultaneously for a period of at least 5 seconds). Therefore, in the embodiment of FIG. 5.5, the priority encoder 476 continues to output the encoded "on" signal to the microcontroller unit 474 upon the subsequent actuation of the "on" key 432 (i.e. after the sustained simultaneous actuation of the "off" key 430 and the "on" key 432). Accordingly, in the embodiment shown, the illumination control module 412 maintains the wireless communications with the luminaires 500 when the power control module 410 receives the "re-pair initiate" (or a "full pair initiate") signal from the user interface panel 404.

As discussed, the microcontroller section 428 may also receive light characteristic signals from the user interface panel 404. Possible "light characteristic" signals include a "brighter" signal, a "dimmer" signal, a "warmer" signal, a "cooler" signal, a "previous scene" signal, and a "next scene" signal. Each of keys 434, 436, 438, 440, 442, 444 is associated with a respective one of the foregoing light characteristic signals. Therefore, in the embodiment of FIG. 5.5, the priority encoder 476 may also output a respective one of the light characteristic signals to the microcontroller unit 474 based on the light characteristics key 434, 436, 438, 440, 442, 444 that is actuated.

For example, upon receiving a "brighter" signal from the priority encoder 476, the microcontroller unit 474 may be programmed to generate a light characteristic command that commands each luminaire 500 increase the intensity of light produced by the luminaire 500, and wirelessly transmit the light characteristic command to the luminaires 500 commanding each luminaire 500 to increase its respective light intensity.

Similarly, upon receiving a "dimmer" signal from the priority encoder 476, the microcontroller unit 474 may be programmed to generate a light characteristic command that commands each luminaire 500 decrease the intensity of light produced by the luminaire 500, and wirelessly transmit the light characteristic command to the luminaires 500 commanding each luminaire 500 to decrease its respective light intensity.

A "warm" colour is a colour that is believed to increase physical and mental energy levels when viewed by the observer. A "warm" colour is typically selected from the group of colours consisting of red, orange, yellow and brown. The microcontroller unit 474 may store, in the memory thereof, the colour palette values of a series of various "warm" colours". Therefore, upon receiving a "warmer" signal from the priority encoder 476, the microcontroller unit 474 is programmed to select the next "warmer" colour from the series of stored "warm" colours, generate a light characteristic command that includes the colour palette value(s) of the selected colour, and wirelessly transmit the light characteristic command to the luminaires 500 commanding the luminaires 500 to adjust the colour of the light produced by the luminaires 500 in accordance with the colour palette value(s) of the light characteristic command.

A "cool" colour is a colour that is believed to have a calming and relaxing influence upon the observer. A "cool" colour is typically selected from the group of colours consisting of blue, green, purple and violet. The microcontroller unit 474 may store, in the memory thereof, the colour palette values of a series of various "cool" colours". Therefore, upon receiving a "cooler" signal from the priority encoder 476, the microcontroller unit 474 is programmed to select the next "cooler" colour from the series of stored "cooler" colours, generate a light characteristic command that includes the colour palette value(s) of the selected colour, and wirelessly transmit the light characteristic command to the luminaires 500 commanding the luminaires 500 to adjust the colour of the light produced by the luminaires 500 in accordance with the colour palette value(s) of the light characteristic command.

A "scene" is a set of predetermined intensity and colour palette values for the various luminaires 500 that are controlled by the illumination control module 412. The microcontroller unit 474 may store a sequence of various "scenes" in the memory thereof. Therefore, upon receiving a "next scene" (or a "previous scene") signal from the priority encoder 476, the microcontroller unit 474 is programmed to select the next (previous) "scene" in the sequence, generate a light characteristic command that includes the intensity/palette values of the selected scene, and wirelessly transmit the light characteristic command to the luminaires 500 commanding the luminaires 500 to adjust the characteristics of light produced by the luminaires 500 in accordance with the intensity/palette values of the light characteristic command.

Since the microcontroller section 428 transmits the light characteristic commands to the luminaires 500 via the wireless transmitter/receiver 426, the luminaires 500 receive the light characteristic commands from the illumination control module 412 via a wireless communications path that excludes the wireless router 300.

Figure 6:
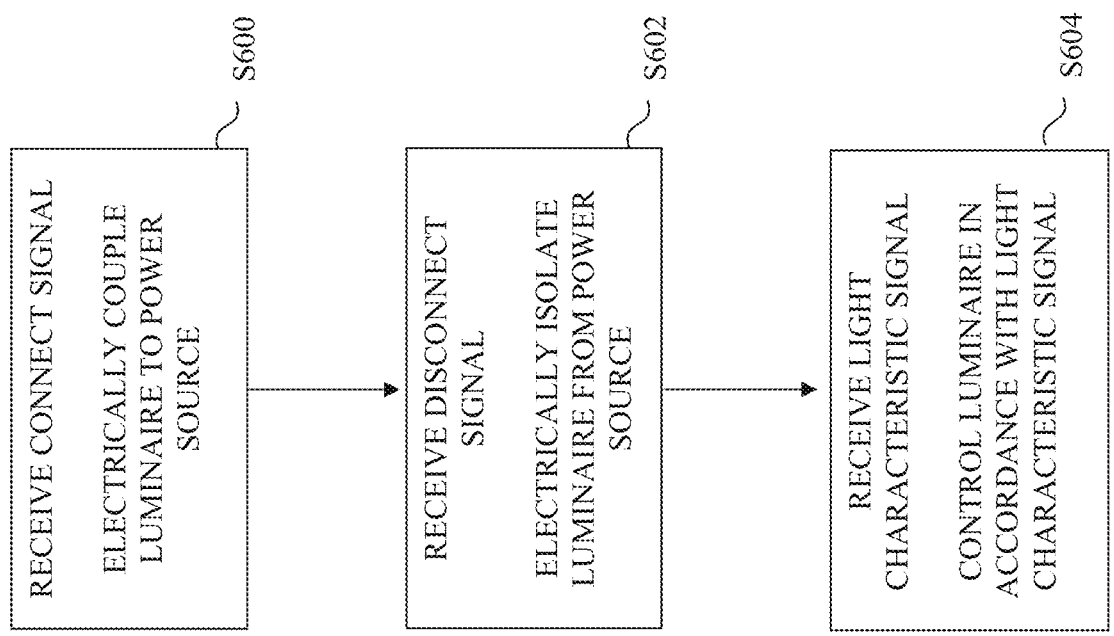
FIG. 6 is a flowchart depicting a method of operation of the exemplary luminaire controller.

A method of operation of the exemplary luminaire controller 400 of FIGS. 5.1-5.5 is depicted in FIG. 6.

As shown, at step S600 the power control module 410 receives a connect signal from the user interface panel 404. Upon receiving the connect signal, the power control module 410 electrically couples a luminaire 500 to the power source 200.

At step S602, the power control module 410 receives a disconnect signal from the user interface panel 404. Upon receiving the disconnect signal, the power control module 410 electrically isolates the luminaire 500 from the power source 200.

At step S604, the illumination control module 412 receives a light characteristic signal from the user interface panel 404. In accordance with the light characteristic signal, the illumination control module 412 wirelessly controls a characteristic of light that is emitted by the luminaire 500.

The invention claimed is:

1. A luminaire controller comprising:
a controller housing;
a user interface panel, a power interface and a load interface extending from the controller housing; and
a power control module and an illumination control module disposed within the controller housing and coupled to the user interface panel,
wherein the power control module is configured to:
receive a connect signal from the user interface panel, and electrically connect the load interface to the power interface upon receipt of the connect signal; and
receive a disconnect signal from the user interface panel, and electrically isolate the load interface from the power interface upon receipt of the disconnect signal; and wherein the illumination control module is configured to:
receive a light characteristic signal from the user interface panel, and in accordance with the light characteristic signal wirelessly control a characteristic of light emitted by a luminaire electrically coupled to the load interface.

2. The luminaire controller according to claim 1, wherein:
the power control module is configured to receive a pair signal from the user interface panel, and to trigger the luminaire to wirelessly pair with a wireless router upon receipt of the pair signal; and
the illumination control module is configured to control the characteristic of light by transmitting an illumination command to the luminaire via a wireless communications path, the communications path excluding the wireless router.

3. The luminaire controller according to claim 2, wherein:
the power control module is configured to trigger the luminaire to wirelessly pair by cyclically (i) electrically connecting the load interface to and (ii) electrically isolating the load interface from the power interface, upon receipt of the pair signal.

4. A method of controlling a luminaire via a luminaire controller, the luminaire controller including a user interface panel, the method comprising the luminaire controller:
receiving a connect signal from the user interface panel, and electrically coupling a luminaire to a power source upon receiving the connect signal;
receiving a disconnect signal from the user interface panel, and electrically isolating the luminaire from the power source upon receiving the disconnect signal; and
receiving a light characteristic signal from the user interface panel, and wirelessly controlling a characteristic of light emitted by the luminaire in accordance with the light characteristic signal.

5. The method according to claim 4, further comprising:
the luminaire controller receiving a pair signal from the user interface panel, and triggering the luminaire to wirelessly pair with a wireless router upon receiving the pair signal; and
wherein the controlling the characteristic of light comprises the luminaire controller transmitting an illumination command to the luminaire via a wireless communications path, the communications path excluding the wireless router.

6. The method according to claim 5, wherein the triggering the luminaire to wirelessly pair comprises the luminaire controller cyclically (i) electrically coupling the luminaire to the power source and (ii) electrically isolating the luminaire from the power source, upon receiving the pair signal.

7. The method according to claim 5, further comprising a wireless controller controlling the characteristic of light by, after the luminaire wirelessly pairing with the wireless router, the wireless controller transmitting a command to the luminaire via an alternate wireless communications path, the alternate communications path including the wireless router.

8. A luminaire network comprising:
a power source; and
a luminaire controller coupled to the power source, wherein the luminaire controller includes a user interface panel and is configured to:

receive a connect signal from the user interface panel, and couple a luminaire to the power source upon receipt of the connect signal;

receive a disconnect signal from the user interface panel, and isolate the luminaire from the power source upon receipt of the disconnect signal; and receive a light characteristic signal from the user interface panel, and wirelessly control a characteristic of light emitted by the luminaire in accordance with the light characteristic signal.

9. The luminaire network according to claim 8, wherein the luminaire controller is further configured to:

receive a pair signal from the user interface panel, and trigger the luminaire to wirelessly pair with a wireless router upon receipt of the pair signal; and control the characteristic of light by transmitting an illumination command to the luminaire via a wireless communications path, the communications path excluding the wireless router.

10. The luminaire network according to claim 9, wherein the luminaire controller is configured to trigger the luminaire to wirelessly pair by cyclically (i) electrically connecting the load interface to the power source and (ii) electrically isolating the load interface from the power source, upon receipt of the pair signal.

11. The luminaire network according to claim 9, further comprising a wireless controller configured to control the characteristic of light via the wireless router by, after the luminaire wirelessly pairing with the wireless router, the wireless controller transmitting a command to the luminaire via an alternate wireless communications path, the alternate communications path including the wireless router.

* * * * *